J. N. Rockwell.
Tempering Metal Tools.
Nº 17,639.    Patented Jun. 23, 1857.
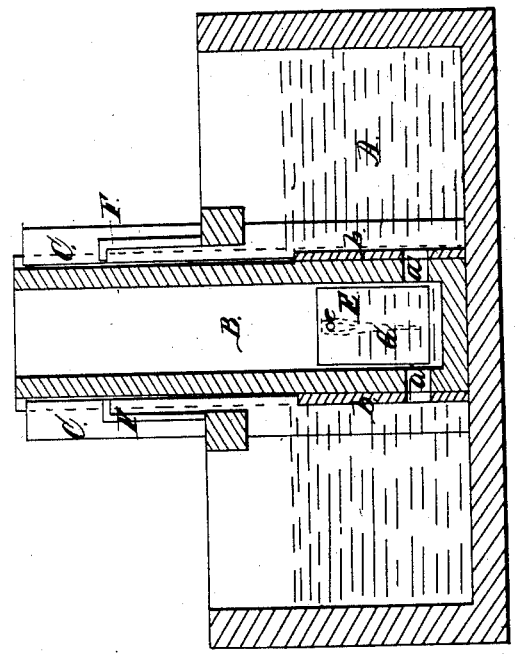
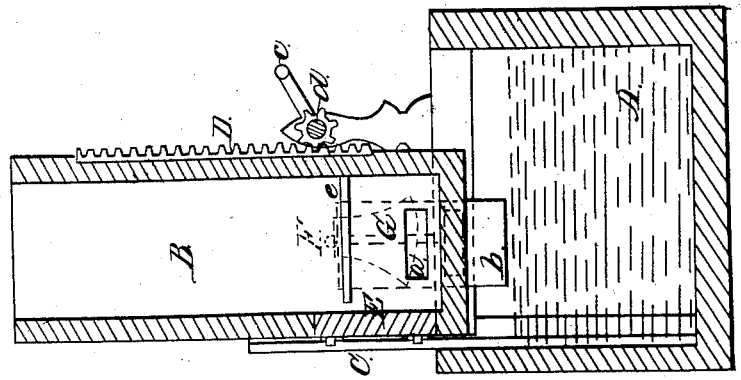

UNITED STATES PATENT OFFICE.

JAMES N. ROCKWELL, OF NAPANOCK, NEW YORK.

HARDENING AXES, &c.

Specification of Letters Patent No. 17,639, dated June 23, 1857.

*To all whom it may concern:*

Be it known that I, JAMES N. ROCKWELL, of Napanock, in the county of Ulster and State of New York, have invented a new and useful Improvement in the Process of Hardening Axes and other Tools and Implements; and I do hereby declare that the following is a full, clear, and exact description of the same, reference being had to the accompanying drawings, forming part of this specification, in which—

Figures 1, and 2, are vertical sections, at right angles to each other, of the apparatus which I employ in carrying out my invention, illustrating my improvement in the hardening process.

Similar letters of reference indicate corresponding parts in both figures.

The ordinary process of hardening axes and most other tools and implements is to plunge them, in a heated state, directly into cold water. By this method some of the water that is converted into steam by contact with the heated surface of the metal, assuming the form of globules, remains in that form attached to the surface of the metal and protects it against the sudden cooling action of the water, thereby causing soft spots in the tool or implement.

The object of this invention is to obviate this difficulty.

This invention consists in providing the movable box or holder in which the ax is placed with one or more valves so arranged that when the box is lowered sufficiently far into the water tank the valves will be suddenly thrown open and allow the liquid to enter the box.

A, is a cistern or tank containing cold water but for all practical requirements may be a pond or stream.

B, is a deep upright box or holder for receiving the ax with an open top, but having a closed bottom and provided with apertures a, a, in opposite sides near the bottom, said apertures being fitted with sliding valves b, b, for the purpose of closing them.

C, C, are two stationary guide posts for guiding the box vertically into the water.

D, is a rack on one side of the box, and d, a pinion gearing with the same for the purpose of raising and lowering the box by turning a crank c.

E, is a door in the front of the box, which opens to admit the axes, and e, is a peg opposite the door on which to hang the ax.

F, F, are two fixed stops for the purpose of closing the valves b, b.

G, shown in red outline, is an ax hanging on the peg e.

The process is conducted in the following manner: The box is first raised entirely out of the water by turning the pinion (d), and as it leaves the water the tops of the sliding valves strike the stops F, F, which, if the valves were previously open, close them as the box continues its ascent a little farther. The door E, is then opened and the ax hung with its eye on the peg e, after which the door is closed and the box B, lowered into the water. As the box arrives at the required depth, the bottoms of the valves b, b, strike upon the bottom of the tank or reservoir A, or upon any suitable stops and the continued descent of the box opens the valves b, b, and allows the water to rush through the apertures a, a, into the box with such force as is due to the head of water surrounding the box, and strike the sides of the ax with sufficient violence to wash from the surface thereof any globules that may form on its surface. The box is supposed to be of such capacity that by the time the water rises in it to the surrounding level, the ax will be sufficiently cooled, when the box may be raised from the tank or cistern. As the box leaves the tank or cistern the water escapes through the open apertures a, a, which are closed again as the box arrives as high as required by means of the stops F, F. The door E, may then be opened, the hardened ax taken out, and another which has been heated and in readiness is put in. In this way the operation may be repeated with considerable rapidity.

I do not claim broadly the hardening of axes or other tools by admitting a stream of water upon their surfaces, for such methods have long been known and employed. This principle as applied to the hardening of axes was patented by Asa Wheeler, July 31, 1849. My invention relates exclusively to a new contrivance for carrying out the above principle. It is of great importance that the water should strike suddenly and with considerable force upon the sides of the ax; for the tempering is thus rendered uniform and perfect. These conditions are more fully realized in my improvement than in any other tempering apparatus that I am acquainted with.

Therefore, what I claim as new in ax tempering devices, and desire to secure by Letters Patent, is, Providing the box or holder (B) in which the ax is placed, with one or more valves $b\ b$ arranged and operating substantially as described.

JAMES N. ROCKWELL.

Witnesses:
JACOB L. STILL,
JOSEPH TERWILLIGG.